US008954282B2

United States Patent
Bouzas et al.

(10) Patent No.: US 8,954,282 B2
(45) Date of Patent: Feb. 10, 2015

(54) AUTONOMIC SEISMIC DATA PROCESSING (75) Inventors: Horacio R. Bouzas, London (GB); Ian Scott, Guildford (GB); Gerard Kavanagh, Horsham (GB)

(73) Assignee: WesternGeco L.L.C., Houston, TX (US)

( * ) Notice: Subject to any disclaimer, the term of this patent is extended or adjusted under 35 U.S.C. 154(b) by 1078 days.

(21) Appl. No.: 12/246,855

(22) Filed: Oct. 7, 2008

(65) Prior Publication Data
US 2009/0099779 A1    Apr. 16, 2009

Related U.S. Application Data (60) Provisional application No. 60/979,804, filed on Oct. 12, 2007.

(51) Int. Cl.
*G01V 1/00*    (2006.01)
*G01V 1/28*    (2006.01)
(52) U.S. Cl.
CPC .................................... *G01V 1/28* (2013.01)
USPC ........................................................... 702/17
(58) Field of Classification Search
CPC ........................................................ G01V 1/30
USPC ...................................................... 702/6–18
See application file for complete search history.

(56) References Cited

U.S. PATENT DOCUMENTS

| 5,361,379 A | 11/1994 | White |
| 6,016,462 A | 1/2000 | Schneider, Jr. et al. |
| 6,049,760 A * | 4/2000 | Scott ............................... 702/14 |

FOREIGN PATENT DOCUMENTS

| EP | 2167993 A1 | 3/2010 |
| WO | 2008154640 A1 | 12/2008 |

OTHER PUBLICATIONS

Ganek, et al., The Dawning of the Automatic Computing Era, IBM Systems Journal, 2003, pp. 5-18, vol. 42, No. 1.
J.R. Quinlan, Generating Production Rules from Decision Trees, Knowledge Acquisition, 1987, pp. 304-307.
J.R. Quinlan, Simplifying Decision Tree, MIT, Dec. 1986, Memo No. 930.
Extended European Search Report of EP Application Serial No. 08166489.8 dated Jan. 2, 2012.

\* cited by examiner

*Primary Examiner* — Stephen Cherry (57) ABSTRACT

Implementations of various technologies for a method for processing seismic data. In one implementation, the method may include receiving a record of seismic data. The record of seismic data may have a plurality of attributes. A first seismic data process may be performed on the record of seismic data. The first seismic data process may generate a plurality of datasets. A selection of a portion of the plurality of attributes for ranking the datasets may be received. A quality score may be determined for each attribute of the portion of the plurality of attributes for each dataset. A ranking may be determined for each dataset based on the quality score.

20 Claims, 5 Drawing Sheets

AUTONOMIC SEISMIC DATA PROCESSING

CROSS-REFERENCE TO RELATED APPLICATIONS

This application claims benefit of U.S. provisional patent application Ser. No. 60/979,804, filed Oct. 12, 2007, which is herein incorporated by reference.

BACKGROUND

1. Field of the Invention

Implementations of various technologies described herein generally relate to methods and systems for autonomous seismic data processing.

2. Description of the Related Art

The following descriptions and examples are not admitted to be prior art by virtue of their inclusion within this section.

In the seismic industry, data processing is a complex, time-consuming and costly exercise that obtains useful information from acquired seismic data. Data processing workflows may include many stages (e.g., five to ten processing stages) and each stage requires many parameters. Before running a data processing job, which may take many months to finish, many test runs are performed on a small portion of the seismic dataset such that optimum processing parameters and work flow can be determined.

Testing is performed in general by the use of batch jobs with a suite of parameters to test. These test jobs are then run overnight and evaluated the following day to see that the test jobs have run correctly. Test data "panels," which are images of seismic data generated by the test jobs, may then be passed to an analyst for a final decision on the parameters to use for the next production processing run. As test jobs often run in parallel, it is almost impossible to measure the true impact of testing on the turnaround time for a full production run. The permutations of stages and parameters potentially produce voluminous test runs. For example, a 6-stage, 10-parameter data processing workflow could have 1 million different testing scenarios.

SUMMARY

Described herein are implementations of various technologies for a method for processing seismic data. In one implementation, the method may include receiving a record of seismic data. The record of seismic data may have a plurality of attributes. A first seismic data process may be performed on the record of seismic data. The first seismic data process may generate a plurality of datasets. A selection of a portion of the plurality of attributes for ranking the datasets may be received. A quality score may be determined for each attribute of the portion of the plurality of attributes for each dataset. The quality score may be determined by comparing the values of the attributes in the record of seismic data to the values of the attributes in the generated datasets. A ranking may be determined for each dataset based on the quality score.

In another implementation, a control dataset may be received. The attributes of the generated datasets may be compared to the attributes of the control dataset. The quality score may be based on the comparison.

In yet another implementation, the quality scores may be normalized across the datasets. In such an implementation, the ranking for each dataset may be determined based on the normalized quality scores. One or more of the highest ranked datasets may then be selected for a second seismic data process. The second seismic data process may be performed on the one or more highest ranked datasets.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraph provides a brief summary of various techniques described herein. In general, various techniques described herein are directed to a system for autonomous seismic data processing. Rather than relying on user intervention to limit testing and production data processing scenarios, the autonomous processing system may evaluate seismic data at each stage of processing to reduce data processing scenarios. At each stage of data processing, multiple datasets may be generated. Each of the generated datasets may represent a possible path in the data processing workflow. In the autonomous seismic data processing system, the generated datasets may be ranked based on the values of specified attributes within each of the datasets. The processing workflows may then be limited to the datasets with the highest rankings. In one implementation, suites of parameters may be tested against samples of seismic data to limit the parameters used in the production processing. One or more implementations of various techniques for autonomous seismic data processing will now be described in more detail with reference to FIGS. 1-5 in the following paragraphs.

Figure 1:
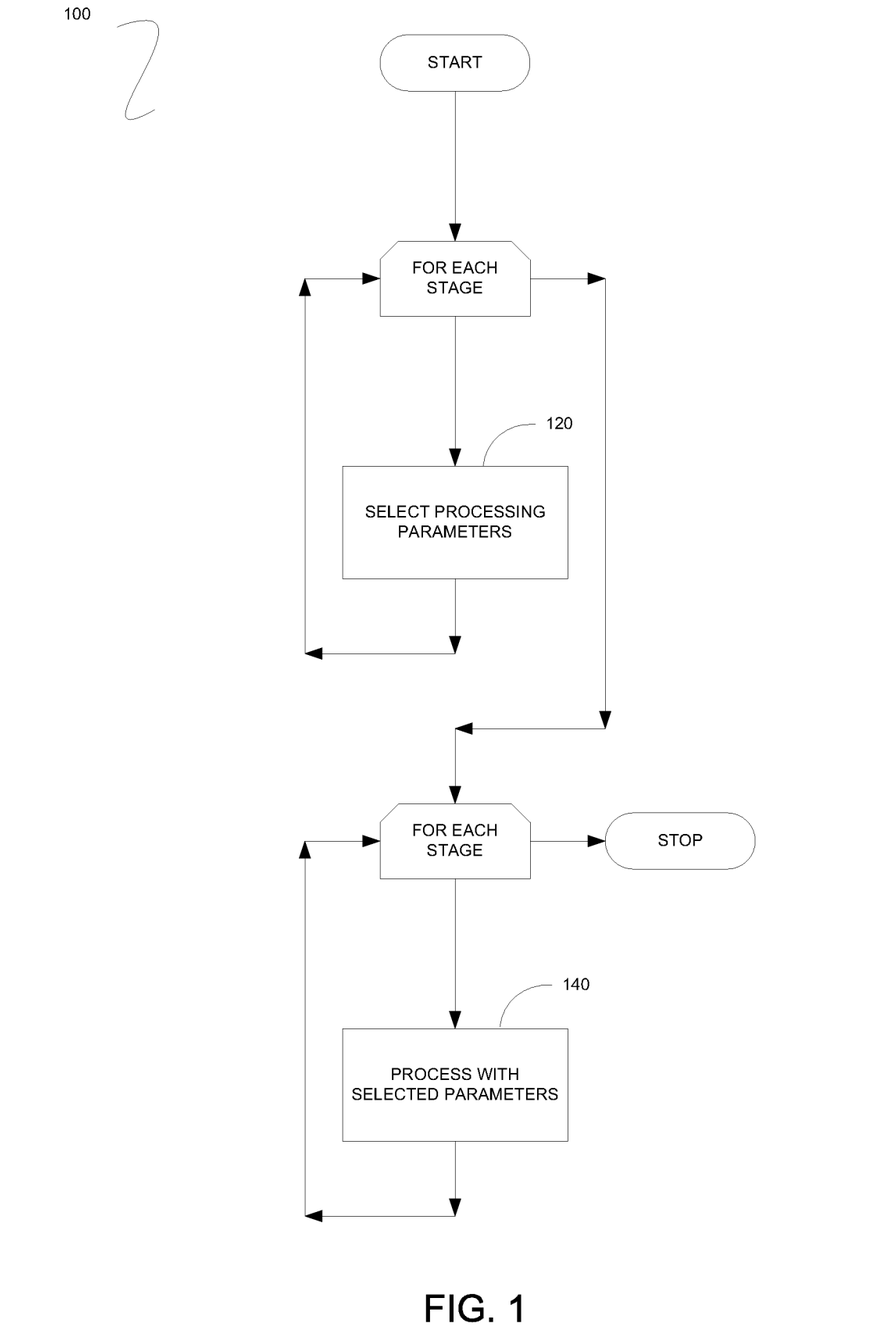
FIG. 1 illustrates a flowchart of a method for autonomous seismic data processing in accordance with one or more implementations of various techniques described herein.

FIG. 1 illustrates a flowchart of a method 100 for autonomous seismic data processing in accordance with one or more implementations of various techniques described herein. It should be understood that while the method 100 indicates a particular order of execution of the operations, in some implementations, certain portions of the operations might be executed in a different order.

Typically, seismic data processing takes place in multiple stages. Seismic data may be processed in numerous ways, depending on the needs of a user. For example, a user may want to perform noise reduction and demultiples processing on the seismic data. Each of these processes may take place in different stages of seismic data processing. For example, the seismic data may first undergo noise reduction, then the noise reduced data may be input to the demultiples process. Accordingly, step 120 may be repeated for each stage of the seismic data processing.

Additionally, each stage may be processed with numerous parameters. Testing a full gather of seismic data or other seismic data volume against a large suite of parameters may use resources that overwhelm a typical seismic data processing system. Accordingly, at step 120, a portion of the parameters may be selected from the larger suite. Step 120 is described in greater detail with reference to FIG. 2.

Once the parameters are selected for each stage, step 140 may be repeated for each stage of the autonomous seismic data processing. At step 140, the seismic data may be processed with the parameters selected for the particular stage. Step 140 is described in greater detail with reference to FIG. 3.

Figure 2:
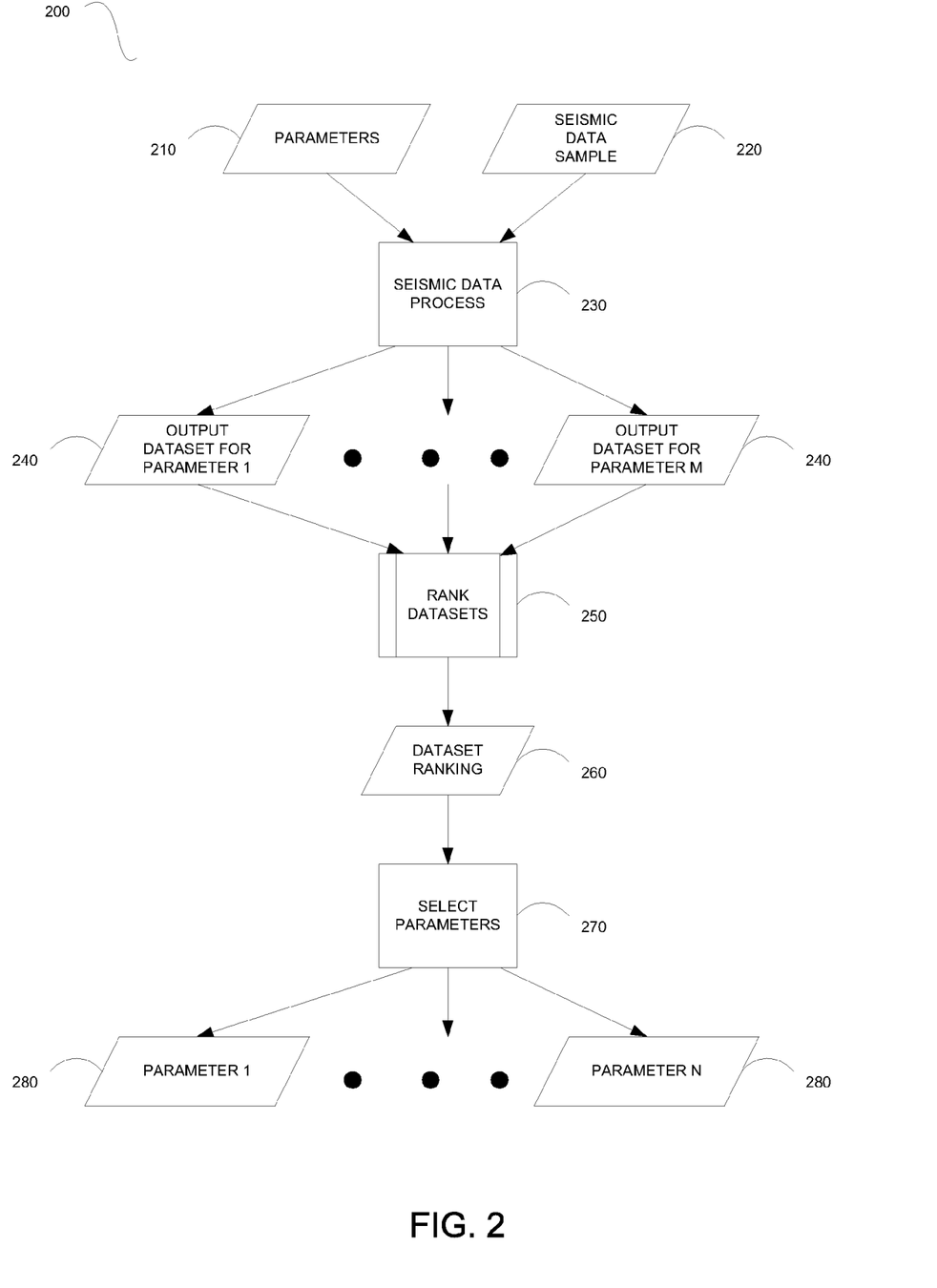
FIG. 2 illustrates a data flow diagram of a method for selecting parameters for an autonomous seismic data processing system according to implementations described herein.

FIG. 2 illustrates a data flow diagram of a method 200 for selecting parameters for an autonomous seismic data processing system according to implementations described herein. As mentioned above, method 200 may be an implementation of step 120.

A suite of parameters 210 and a seismic data sample 220 may be input to a seismic data process 230. The seismic data sample 220 may be collected in a seismic survey. In another implementation, the seismic data sample 220 may be a sampling of seismic data that is used for synthetic seismogram generation, or velocity modeling.

The seismic data sample 220 may include a number of attributes that describe seismic data. Such attributes may include signal to noise ratio, seismic frequency, continuity, bandwidth, uncertainty and the like. It should be noted that these are merely examples of attributes, and are not intended to limit implementations of various technologies described herein.

The seismic data process 230 may be any one of a number of seismic data processes, such as a remove multiples process, band pass filtering process, frequency and wavenumber (FK) filtering process, seismic stacking process, deconvolution process, migration process and the like. It should be noted that these are merely examples of seismic data processes. The examples listed are not intended to limit implementations of various technologies described herein.

The seismic data process 230 may generate an output dataset 240 for each of the parameters 210. The parameters 210 may be a number of data values used in a particular seismic data process. For example, parameters in a seismic stacking process may include a number of different mutes. In FIG. 2, m output datasets 240 are generated, indicating m parameters in the parameters 210.

In one implementation, more than one seismic data process 230 may be used to process the seismic data sample 220. In such an implementation, the parameters 210 only include one value and thus, each seismic data process 230 will generate one output dataset 240.

The output datasets 240 may then be input to a rank datasets process 250. The rank datasets process 250 may generate a dataset ranking 260 that ranks the output datasets 240 according to specified rules. These rules may indicate how to rank the output datasets 240 based on the values of attributes within the output datasets 240. For example, one rule may rank the output datasets 240 according to the values of the signal to noise ratio attribute. In such a scenario, the output datasets 240 with high signal to noise ratios may be ranked higher than output datasets 240 with lower signal to noise ratios. The rank datasets process 250 is described in greater detail with reference to FIG. 4.

The dataset ranking 260 may be input to a select parameters process 270. The select parameters process 270 may determine the selected parameters 280 that are used to generate the highest ranked datasets in the dataset ranking 260. In the scenario where the output datasets 240 are generated for multiple seismic data processes 230, the select parameters process 270 may determine the seismic data processes 230 that generate the highest ranked datasets. In FIG. 2, n parameters are shown, indicating that n parameters are selected from the m parameters in the original parameters 210, where n parameters are a portion of m parameters.

Figure 3:
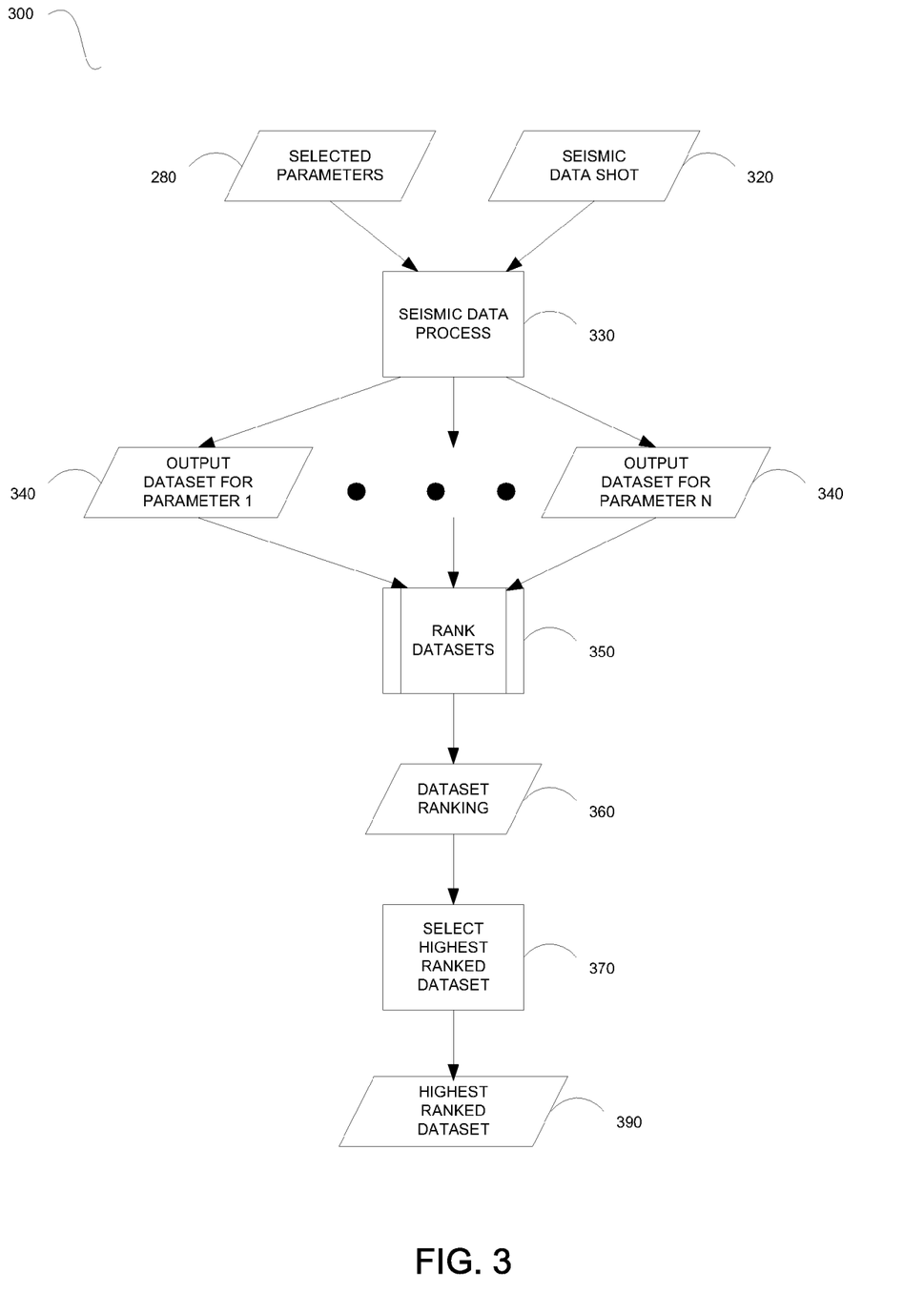
FIG. 3 illustrates a flowchart of an autonomous seismic data processing system according to implementations described herein.

FIG. 3 illustrates a flowchart of a method 300 for autonomous seismic data processing according to implementations described herein. As mentioned above, method 300 may be an implementation of step 140. Method 300 may represent the actual production run of seismic data processing, using the selected parameters 280 from the method 200.

The selected parameters 280 and a seismic data 320 may be input to a seismic data process 330. Similar to the seismic data sample 220, the seismic data 320 may include a number of attributes for describing seismic data. However, the seismic data 320 may include a full shot of seismic data instead of a sampling.

The seismic data process 330 may generate an output dataset 340 for each selected parameter 280. For a particular stage, the seismic data process 330 may correspond with the seismic data process 230 used in method 200 for that stage. In other words, if the seismic noise reduction process is the seismic data process 230 in method 200, then the seismic noise reduction process is the seismic data process 330 in method 300.

In one implementation, the method 300 may be used without benefit of the method 200 for selecting parameters. In such an implementation, the selected parameters 280 may include the full suite of parameters 210. Alternately, the selected parameters 280 may be a limited set of parameters selected by the user from the full suite of parameters 210.

Similar to the seismic data process 230, the seismic data process 330 may generate an output dataset 340 for each parameter in the selected parameters 280. The output datasets 340 may be input to a rank datasets process 350. The rank datasets process 350 may generate a dataset ranking 360 that ranks the output datasets 340 according to the rules described above. The rank datasets process 350 is described in greater detail with reference to FIG. 4.

The dataset ranking 360 may be input to a select highest ranked dataset process 370, where a highest ranked dataset 390 of the output datasets 340 is selected. In one implementation, the highest ranked dataset 390 may be input to a second seismic data process in the next stage of the autonomous seismic data processing.

In another implementation, the dataset ranking 360 may be insufficient to select the highest ranked dataset. For example, there may be multiple output datasets 340 with equally high rankings. In such a scenario, the select highest ranked dataset process 370 may incorporate an Andon process. In the Andon process, the user may specify conditions under which there is no highest ranked dataset 390 selected, and conditions under which the user intervenes to select the highest ranked dataset 390. In a scenario where no highest ranked dataset 390 is selected, the multi-stage seismic data process (described in FIG. 1) may be halted.

Figure 4:
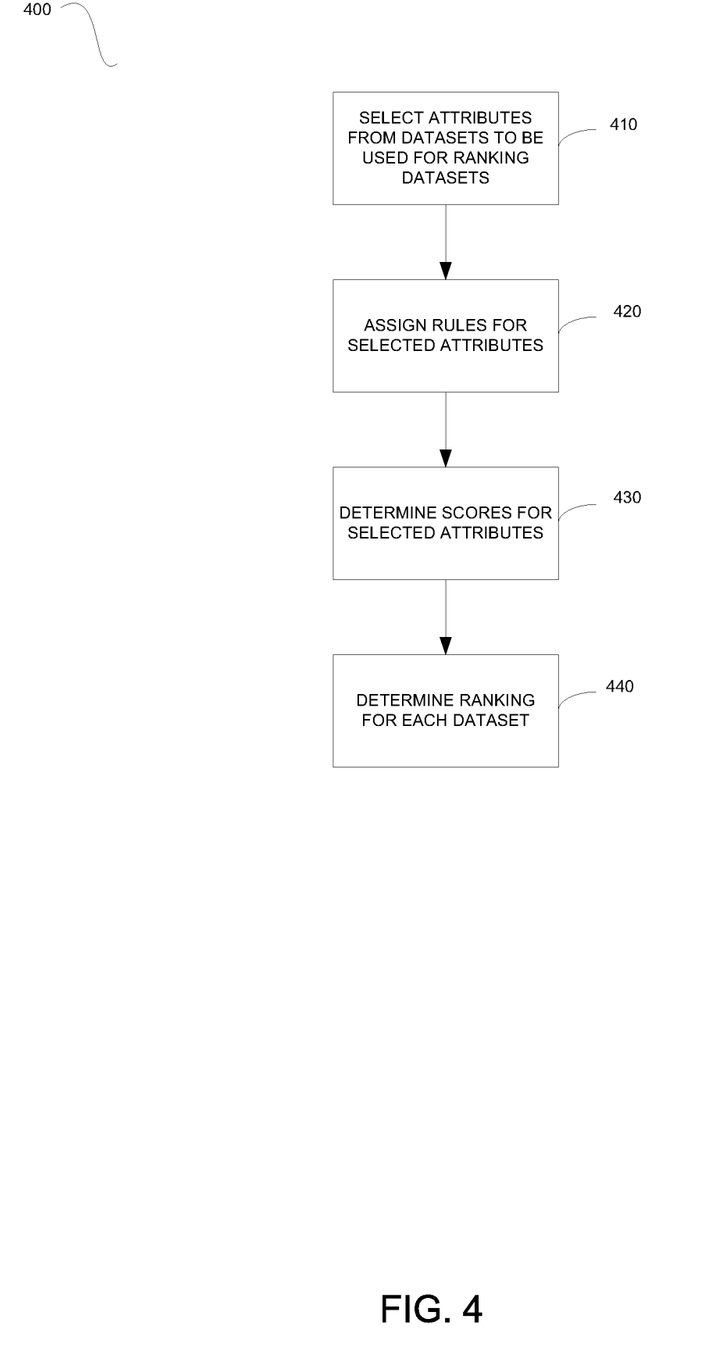
FIG. 4 illustrates a flowchart of a method for ranking datasets in an autonomous seismic data processing system according to implementations described herein.

FIG. 4 illustrates a flowchart of a method 400 for ranking datasets in an autonomous seismic data processing system according to implementations described herein. The method 400 may be performed by the rank datasets processes 250, 350.

At step 410, a portion of the attributes may be selected from the output datasets 240, 340. The selected attributes may be used for ranking the output datasets 240, 340. More specifically, values in the selected attributes may be compared across the output datasets 240, 340 in order to rank the output datasets 240, 340 against each other.

At step 420, a rule may be assigned to each of the selected attributes. The rule may specify how to score a particular value of an attribute for one of the output datasets 240, 340. The score is also referred to herein as a quality score. The quality score may indicate the quality of data in the output datasets. In other words, the quality score may indicate a preference level for certain values of the selected attribute in the ranking of the output datasets 240, 340. For example, high values in the high frequency bandwidth attribute may be preferred over low values. In this instance, a rule may specify that a high value in the high frequency bandwidth attribute is scored higher than a low value in the high frequency bandwidth attribute.

In one implementation, the rule may be based on how the value of the attribute is changed by the seismic data processes 230, 330. For example, the rule may specify that the score for an increase in the signal to noise ratio is higher than the score for a decrease. In such a case, the value of the noise to signal ratio in the input dataset, e.g., the seismic data sample 220, may be compared to the value in the output dataset 240. The score for the signal to noise ratio attribute may then be scored accordingly.

In another implementation, the rule may be based on a range of expected values for the selected attribute. In other words, values of the attribute within a specified range of expected values may be scored higher than values outside of the range. In such an implementation, the score may be based on where the value of the attribute lies within the range.

At step 430, the quality score may be determined for each selected attribute for each dataset based on the rule for the selected attribute. In one implementation, a control dataset may be used to determine the quality score for the selected attribute. The control dataset may be used in comparison with the output datasets 240, 340 in determining the score of selected attributes. In the scenario where high values are preferred for the high frequency bandwidth attribute, the control dataset may have a threshold value for the high frequency bandwidth. The high frequency bandwidth value in each of the output datasets 240, 340 may be compared to the high frequency bandwidth value in the control dataset. If the high frequency bandwidth value in the output datasets 240, 340 is greater than the high frequency bandwidth value in the control dataset, the high frequency bandwidth attribute may be scored higher. Similarly, if the high frequency bandwidth value in the output datasets 240, 340 is less than the high frequency bandwidth value in the control dataset, the high frequency bandwidth attribute may be scored lower.

In one implementation, the quality scores of each selected attribute may be normalized across the output datasets 240, 340. The normalization may map the quality scores to a 0-100 scale. On the 0-100 scale, the selected attribute for the output dataset 240, 340 with the lowest score may be normalized as 0. Similarly, the selected attribute for the output dataset 240, 340 with the highest score may be normalized as 100. The quality scores that fall between the highest and lowest scores may be apportioned accordingly between 0 and 100.

At step 440, the ranking for each dataset may be determined based on the quality scores for each attribute of the output datasets 240, 340. For example, after the quality scores for each attribute have been determined, each dataset may include a number of quality scores, one for each of the selected attributes. The ranking may be based on the cumulative scores for each of the output datasets 240, 340. In one implementation, the scores for each of the selected attributes may be weighted before added into a fuzzy logic control system that determines the ranking.

Fuzzy logic is a form of multi-valued logic to deal with reasoning that is approximate rather than precise. Fuzzy logic is best explained in opposition to binary logic. In binary logic, the truth of a statement can be evaluated as a binary number. In other words, the truth of a statement is exclusively 0 (false) or 1 (true). With binary logic, a statement is true or it is not. In fuzzy logic, a degree of truth can be determined, where the truth of a statement, expressed numerically, can range between 0 and 1. In fuzzy logic, the truth of a statement is not constrained to the two truth values {true, false} as in binary logic. Instead, the truth of a statement can range between 0 and 1, inclusively.

In another implementation, the ranking may be based on categories of attributes where each of the attributes may belong to higher level categories. For example, a bandwidth category may include a high frequency bandwidth attribute, and a low frequency bandwidth attribute. In such an implementation, cumulative scores for each category may be determined by a fuzzy logic control system based on the scores of the attributes within each category. The ranking may then be determined by a second fuzzy logic control system that uses the cumulative scores for the categories for each dataset.

In another implementation, the scores for each of the selected attributes may be weighted within each category to determine the cumulative scores for the categories. The categories themselves may also be weighted before determining the rankings based on the categories. In yet another implementation, the categories may be normalized across the datasets. The normalization of the categories of the datasets may be performed in a manner similar to the normalization of the attributes described above.

Figure 5:
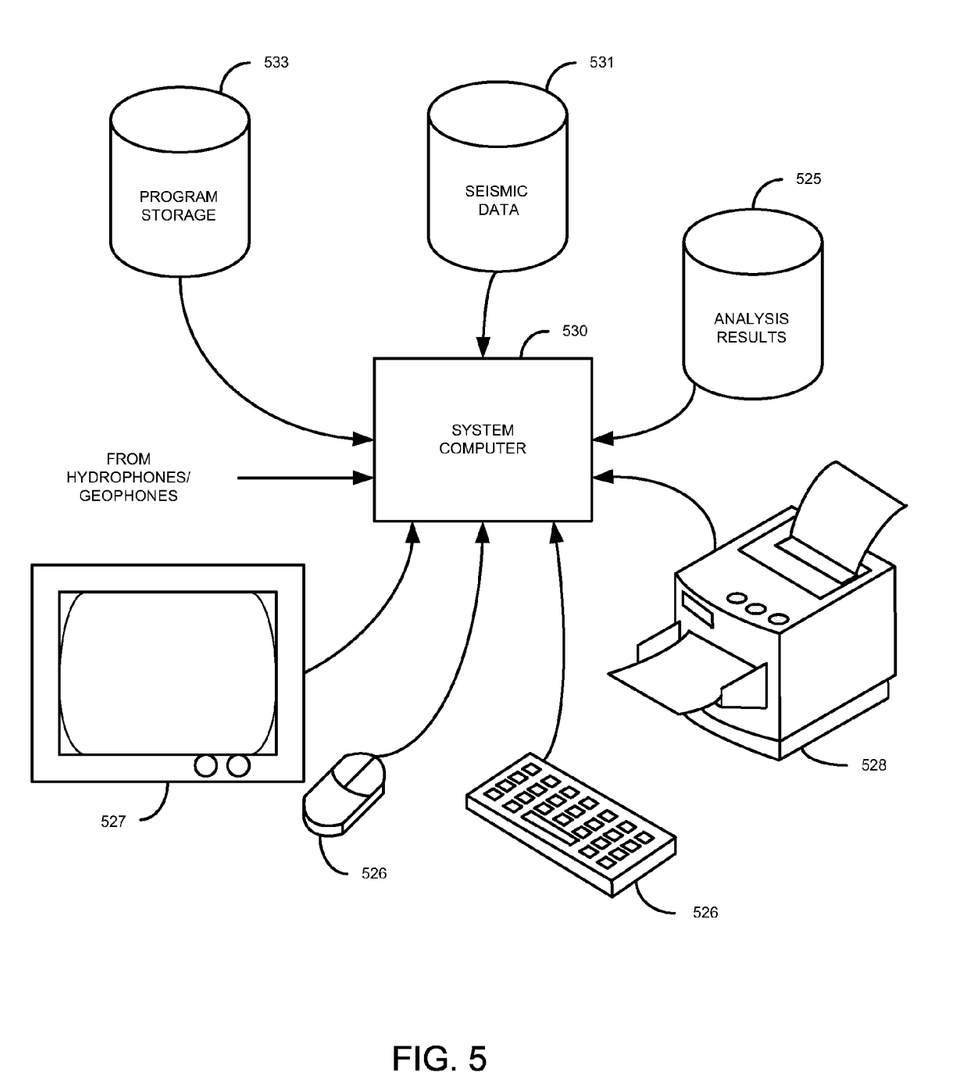
FIG. 5 illustrates a computer network into which implementations of various technologies described herein may be implemented.

FIG. 5 illustrates a computing system 500, into which implementations of various technologies described herein may be implemented. The computing system 500 may include one or more system computers 530, which may be implemented as any conventional personal computer or server. However, those skilled in the art will appreciate that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, and the like.

The system computer 530 may be in communication with disk storage devices 529, 531, and 533, which may be external hard disk storage devices. It is contemplated that disk storage devices 529, 531, and 533 are conventional hard disk drives, and as such, will be implemented by way of a local area network or by remote access. Of course, while disk storage devices 529, 531, and 533 are illustrated as separate devices, a single disk storage device may be used to store any and all of the program instructions, measurement data, and results as desired.

In one implementation, seismic data from the receivers may be stored in disk storage device 531. The system computer 530 may retrieve the appropriate data from the disk storage device 531 to process seismic data according to program instructions that correspond to implementations of various technologies described herein. The program instructions may be written in a computer programming language, such as C++, Java and the like. The program instructions may be stored in a computer-readable medium, such as program disk storage device 533. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 530.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 530 may present output primarily onto graphics display 527, or alternatively via printer 528. The system computer 530 may store the results of the methods described above on disk storage 529, for later use and further analysis. The keyboard 526 and the pointing device (e.g., a mouse, trackball, or the like) 525 may be provided with the system computer 530 to enable interactive operation.

The system computer 530 may be located at a data center remote from the survey region. The system computer 530 may be in communication with the receivers (either directly or via a recording unit, not shown), to receive signals indicative of the reflected seismic energy. These signals, after conventional formatting and other initial processing, may be stored by the system computer 530 as digital data in the disk storage 531 for subsequent retrieval and processing in the manner described above. While FIG. 5 illustrates the disk storage 531 as directly connected to the system computer 530, it is also contemplated that the disk storage device 531 may be accessible through a local area network or by remote access. Furthermore, while disk storage devices 529, 531 are illustrated as separate devices for storing input seismic data and analysis results, the disk storage devices 529, 531 may be implemented within a single disk drive (either together with or separately from program disk storage device 533), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
   receiving seismic data having a plurality of attributes;
   receiving one or more parameters for processing the seismic data;
   performing, by a computer, a seismic data process on the seismic data to generate a plurality of datasets using the one or more parameters;
   determining a quality score for a respective dataset in the plurality of datasets, wherein the quality score is based at least in part on a respective attribute in the plurality of attributes; and
   determining a ranking for the plurality of datasets, comprising:
   computing a sum of quality scores for the respective dataset; and
   comparing the sum of quality scores from respective datasets in the plurality of datasets.

2. The method of claim 1, further comprising assigning one or more rules to the respective attributes, wherein the one or more rules specify how the respective attributes are scored.

3. The method of claim 1, wherein determining the quality score comprises:
   comparing a first value of an attribute in the seismic data to a second value of the attribute in at least one of the datasets; and
   assigning a score based on the comparison.

4. The method of claim 1, wherein determining the quality score comprises:
   receiving a control dataset having an attribute;
   comparing the attribute of the respective datasets to the attribute of the control dataset; and
   determining a quality score for the attribute of the respective datasets based on the comparison.

5. The method of claim 1, wherein determining the ranking further comprises:
   multiplying the quality score by a weight before computing the sum.

6. The method of claim 1, wherein the ranking is determined by:
   grouping two or more attributes of the respective dataset into a plurality of categories;
   computing a sum of quality scores for each category; and
   comparing the sums.

7. The method of claim 1, further comprising:
   determining whether one or more specific conditions for the datasets are met, wherein the specific conditions are associated with the ranking;
   automatically requesting user intervention to analyze the datasets upon determining that the one or more specific conditions are met; and
   receiving input from a user about at least one of the datasets that met the specific conditions.

8. The method of claim 1, further comprising:
   determining whether one or more specific conditions for the datasets are met, wherein the specific conditions are associated with the quality score for each dataset;

automatically requesting user intervention to analyze the datasets upon determining that the one or more specific conditions are met; and receiving input from a user about at least one of the datasets that met the specific conditions.

9. The method of claim 1, wherein the quality score for each of the datasets is between two values on a predetermined scale.

10. The method of claim 1, wherein the one or more parameters comprise one or more mutes for use in a seismic stacking process.

11. The method of claim 1, wherein determining the quality score comprises:
assigning a higher score to an increase in a signal to noise ratio attribute than to a decrease in the signal to noise ratio attribute.

12. The method of claim 1, further comprising:
selecting one or more highest ranked datasets based on the ranking; and
performing a second seismic data process on the one or more highest ranked datasets.

13. The method of claim 1, wherein the seismic data process is selected from the group consisting of: a seismic noise reduction process; a remove multiples process; a band pass filtering process; a frequency and wavenumber (FK) filtering process; a seismic stacking process; a deconvolution process; and a migration process.

14. A non-transitory computer-readable medium having stored thereon computer-executable instructions which, when executed by a computer, cause the computer to:
receive seismic data having a plurality of attributes;
receive one or more parameters for processing the seismic data;
perform a seismic data process on the seismic data to generate one or more datasets using the one or more parameters;
determine a quality score for a respective dataset in the plurality of datasets, wherein the quality score is based at least in part on a respective attribute in the plurality of attributes; and
determine a ranking for the plurality of datasets, comprising:
compute a sum of quality scores for the respective dataset; and
compare the sum of quality scores from respective datasets in the plurality of datasets.

15. The computer-readable medium of claim 14, further comprising computer-executable instructions which, when executed by a computer,
assign one or more rules to the respective attributes, wherein the one or more rules specify how the respective attributes are scored.

16. The computer-readable medium of claim 14, wherein the computer-executable instructions configured to determine the quality score comprises computer-executable instructions which, when executed by the computer, cause the computer to:
compare a first value of an attribute in the seismic data to a second value of the attribute in at least one of the datasets; and
assign a score based on the comparison.

17. The computer-readable medium of claim 14, wherein the computer-executable instructions configured to determine the quality score further comprises computer-executable instructions which, when executed by a computer, cause the computer to:
receive a control dataset having an attribute;
compare the attribute of the respective datasets to the attribute of the control dataset; and
determine a quality score for the attribute of the respective datasets based on the comparison.

18. The computer-readable medium of claim 14, wherein the computer-executable instructions configured to determine the ranking further comprises computer-executable instructions which, when executed by a computer, cause the computer to:
multiply the quality score by a weight before the sum is computed.

19. A computer system, comprising:
a processor; and
a memory comprising program instructions executable by the processor to:
receive seismic data having a plurality of attributes;
receive one or more parameters for processing the seismic data;
perform a seismic data process on the seismic data to generate a plurality of datasets using the one or more parameters;
determine a quality score for a respective dataset in the plurality of datasets, wherein the quality score is based at least in part on a respective attribute in the plurality of attributes;
determine a ranking for the plurality of datasets, comprising:
compute a sum of quality scores for the respective dataset; and
compare the sum of quality scores from respective datasets in the plurality of datasets;
select one or more highest ranked datasets based on the ranking; and
perform a second seismic data process on the one or more highest ranked datasets.

20. The system of claim 19, wherein the memory further comprises program instructions executable by the processor to assign one or more rules to respective attributes, wherein the one or more rules specify how the respective attributes are scored.

* * * * *